United States Patent
Xie et al.

(10) Patent No.: US 10,372,256 B2
(45) Date of Patent: Aug. 6, 2019

(54) TOUCH PANELS AND THE DRIVING METHODS AND TOUCH DISPLAYS THEREOF

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Jianxing Xie, Guangdong (CN); Yu-cheng Tsai, Guangdong (CN); Chun-hung Huang, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 14/905,871

(22) PCT Filed: Dec. 24, 2015

(86) PCT No.: PCT/CN2015/098775
§ 371 (c)(1),
(2) Date: Jan. 18, 2016

(87) PCT Pub. No.: WO2017/088231
PCT Pub. Date: Jun. 1, 2017

(65) Prior Publication Data
US 2017/0262114 A1 Sep. 14, 2017

(30) Foreign Application Priority Data

Nov. 25, 2015 (CN) .......................... 2015 1 0831374

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ............................... G06F 3/0416; G06F 3/044
See application file for complete search history.

(56) References Cited

U.S. PATENT DOCUMENTS 9,639,191 B2 * 5/2017 Takeuchi .............. G06F 3/0412
2002/0158995 A1 * 10/2002 Hwang ............. G02F 1/136227
349/43

(Continued)

FOREIGN PATENT DOCUMENTS

CN  1940842 A   4/2007
CN  101630081 A  1/2010

(Continued)

*Primary Examiner* — Sejoon Ahn
(74) *Attorney, Agent, or Firm* — Andrew C. Cheng

(57) ABSTRACT

A driving method of touch panels is disclosed. The touch panel includes gate lines and data lines intersecting with each other, and at least one switch component arranged at intersections of the gate lines and the data lines, and the switch component connects to the gate line and the data line. During a touch scanning phase, when a touch scanning voltage is applied to a gate line, a gate turn-off voltage of the gate line oscillates together with the touch scanning voltage at the same amplitude and frequency to prevent the switch component from being turned on during the touch scanning phase. In addition, the touch panel and the touch display driven by the driving method are disclosed.

5 Claims, 3 Drawing Sheets

(56) References Cited

U.S. PATENT DOCUMENTS

| | | | |
|---|---|---|---|
| 2006/0092143 A1* | 5/2006 | Kasai | G06F 3/0416 345/175 |
| 2008/0309633 A1 | 12/2008 | Hotelling | |
| 2010/0253638 A1* | 10/2010 | Yousefpor | G06F 3/0412 345/173 |
| 2011/0025635 A1* | 2/2011 | Lee | G06F 1/3203 345/173 |
| 2011/0074705 A1* | 3/2011 | Yousefpor | G06F 3/041 345/173 |
| 2012/0162121 A1* | 6/2012 | Chang | G06F 3/0416 345/174 |
| 2013/0234954 A1* | 9/2013 | Koide | G06F 3/0488 345/173 |
| 2013/0286300 A1* | 10/2013 | Lee | G02F 1/13306 349/12 |
| 2013/0300681 A1* | 11/2013 | Jamshidi-Roudbari | G06F 3/0412 345/173 |
| 2013/0307787 A1* | 11/2013 | Robinson | G06F 3/0416 345/173 |
| 2013/0314343 A1* | 11/2013 | Cho | G06F 3/0412 345/173 |
| 2013/0314361 A1* | 11/2013 | Saitoh | G06F 3/0412 345/173 |
| 2013/0314372 A1* | 11/2013 | Chang | G06F 3/044 345/174 |
| 2013/0328824 A1* | 12/2013 | Krah | G06F 3/041 345/174 |
| 2013/0335374 A1* | 12/2013 | Sugita | G06F 3/0412 345/174 |
| 2014/0184562 A1* | 7/2014 | Chang | G06F 3/0416 345/174 |
| 2014/0225838 A1* | 8/2014 | Gupta | G06F 3/0412 345/173 |
| 2014/0285465 A1* | 9/2014 | Hayashi | G06F 3/044 345/174 |
| 2014/0375922 A1* | 12/2014 | Park | G02F 1/136286 349/46 |
| 2015/0002421 A1* | 1/2015 | Kim | G06F 3/041 345/173 |
| 2015/0097817 A1* | 4/2015 | Chung | G09G 3/3696 345/206 |
| 2015/0193045 A1* | 7/2015 | Zhou | G09G 3/3233 345/174 |
| 2015/0220201 A1* | 8/2015 | Wu | G06F 3/0412 345/173 |
| 2015/0301639 A1* | 10/2015 | Shin | G06F 3/0412 345/173 |
| 2016/0004371 A1* | 1/2016 | Kim | G06F 3/0418 345/173 |
| 2016/0179256 A1* | 6/2016 | Yang | G06F 3/0412 345/173 |
| 2016/0202815 A1* | 7/2016 | Zheng | G06F 3/044 345/174 |
| 2016/0370922 A1* | 12/2016 | Fan | G06F 3/0416 |
| 2017/0024043 A1* | 1/2017 | Omid-Zohoor | G06F 3/0412 |
| 2017/0115798 A1* | 4/2017 | Ho | G06F 3/0416 |
| 2017/0168605 A1* | 6/2017 | Xi | G06F 3/044 |

FOREIGN PATENT DOCUMENTS

| | | |
|---|---|---|
| CN | 101634917 A | 1/2010 |
| CN | 102262472 A | 11/2011 |
| CN | 103135868 A | 6/2013 |
| CN | 104731426 A | 6/2015 |
| WO | WO2011035486 A1 | 3/2011 |

* cited by examiner

TOUCH PANELS AND THE DRIVING METHODS AND TOUCH DISPLAYS THEREOF

BACKGROUND OF THE INVENTION

1. Field of the Invention

The present disclosure relates to touch display technology, and more particularly to a touch panel and the driving method and touch display thereof.

2. Discussion of the Related Art

With the popularity of the smart devices, capacitive touch panels have been adopted in a variety of electronic devices, such as phones and tablets. Currently, the capacitive touch panels usually adopt three solutions including on glass solution (OGS) On-Cell (mounted) and In-Cell (embedded). The manufacturing process of In-Cell solution is characterized by attributes such as thinner, better transparency, and more stable structure, when compared with the OGS and the On-Cell.

With respect to the in-cell technology, during the touch scanning phase, the control end of the switch component, such as a thin film transistor (TFT), may be turned on due to the applied touch scanning voltage. This may cause the electrical leakage with respect to the pixels such that the display performance is affected. Thus, the conventional technology has to be improved and developed.

SUMMARY

In one aspect, a driving method of touch panels includes: a touch display comprises gate lines and data lines intersecting with each other, and at least one switch component arranged at intersections of the gate lines and the data lines, and the switch component connects to the gate line and the data line; and wherein during a touch scanning phase, when a touch scanning voltage is applied to a gate line, a gate turn-off voltage of the gate line oscillates together with the touch scanning voltage at the same amplitude and frequency to prevent the switch component from being turned on during the touch scanning phase.

In another aspect, a touch panel includes: gate lines and data lines intersecting with each other, and at least one switch component arranged at intersections of the gate lines and the data lines, and the switch component connects to the gate line and the data line; and wherein during a touch scanning phase, when a touch scanning voltage is applied to a gate line, a gate turn-off voltage of the gate line oscillates together with the touch scanning voltage at the same amplitude and frequency to prevent the switch component from being turned on during the touch scanning phase.

Wherein during the touch scanning phase, when the touch scanning voltage is applied, the data voltage applied toward the data line oscillates together with the touch scanning voltage at the same amplitude and frequency to reduce coupling capacitance between the data line and a common electrode operating as a touch electrode.

Wherein the switch component is a thin film transistor (TFT), a gate of the TFT connects to the gate line, a source of the TFT connects to the data line, and a drain of the TFT connects to a pixel electrode.

Wherein the TFT is a PMOS TFT, NMOS TFT, or CMOS TFT.

In view of the above, the control end of the switch component is prevented from being turned on by configuring the gate turn-off voltage to oscillate together with the touch scanning voltage at the same amplitude and frequency. In this way, the electrical leakage of the pixel current is avoided so as to enhance the display performance.

DETAILED DESCRIPTION OF THE EMBODIMENTS

Figure 1:
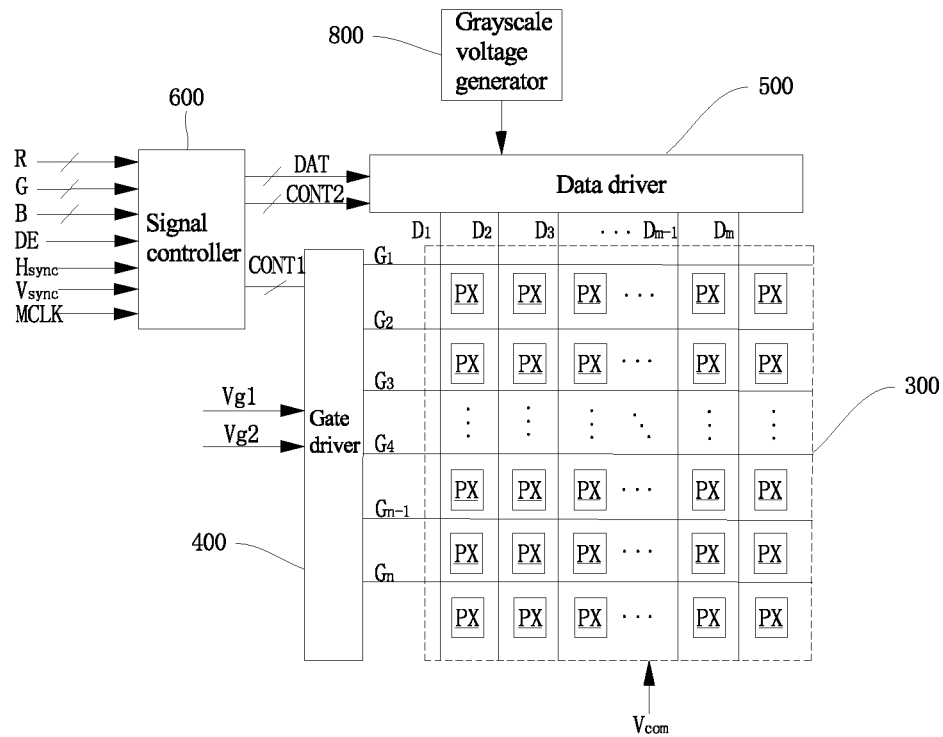
FIG. 1 is a block diagram of the touch panel in accordance with one embodiment.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
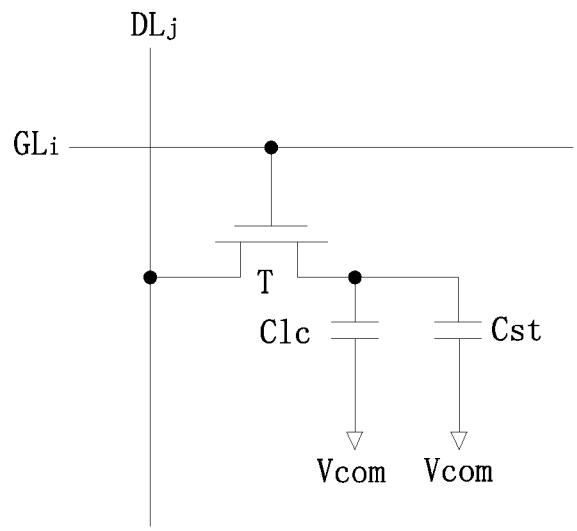
FIG. 2 is a circuit diagram of the pixel of the touch panel of FIG. 1.

FIG. 1 is a block diagram of the touch panel in accordance with one embodiment. FIG. 2 is a circuit diagram of the pixel of the touch panel of FIG. 1. In the embodiment, the liquid crystal panel is taken as one example to illustrate the touch panel, but it can be understood that the present disclosure is not limited thereto.

Referring to FIG. 1, the touch panel include a liquid crystal panel component 300, a gate driver 400, a data driver 500, a grayscale voltage generator 800 connecting to the data driver 500, and a signal controller 600 (or called as a timing controller) for controlling the liquid crystal panel component 300, the gate driver 400, the data driver 500, and the grayscale voltage generator 800. Both of the gate driver 400 and the data driver 500 connect to the liquid crystal panel component 300.

The liquid crystal panel component 300 includes a plurality of display signal lines and a plurality pixels (PX) connecting to the display signal lines. The pixels (PX) are arranged in a matrix. The liquid crystal panel component 300 may include a down display panel (not shown) and a top display panel (not shown) facing toward each other, and a liquid crystal layer (not shown) provided between the top display panel and the down display panel.

The display signal lines may be arranged on the down display panel. The display signal lines may include the gate lines ($G_1$ through $G_n$) transmitting the gate signals and the data lines ($D_1$ through $D_m$) for transmitting the data signals. The gate lines ($G_1$ through $G_n$ extend along a row direction and are parallel to each other, and the data lines ($D_1$ through $D_m$) extend along a column direction and are parallel to each other.

Each of the pixels (PX) includes a switch component connecting to a corresponding gate line and a corresponding data line, and a liquid crystal capacitor connecting to the switch component. If necessary, each of the pixels (PX) may include a storage capacitor connecting with the liquid crystal capacitor in parallel.

The switch component of each of the pixels (PX) is a three-ends component, and thus the switch component includes a control end connecting to the corresponding gate line, an input end connecting to the corresponding data line, and an output end connecting to the corresponding liquid crystal capacitor.

The gate driver 400 connects to the gate lines ($G_1$ through $G_n$) and applies the gate voltage to the gate lines ($G_1$ through $G_n$). The gate voltage is a combination of the gate turn-on voltage (Vg1) and the gate turn-off voltage (VG2) of the gate driver 400 applied from an external source. Referring to FIG. 1, one side of the liquid crystal panel component 300 is configured with the gate driver 400, and the gate lines ($G_1$ through $G_n$) connect to the gate driver 400. In one example, two gate drivers may be configured at two lateral sides of the liquid crystal panel component 300, and the gate lines ($G_1$ through $G_n$) connect to each of the gate driver. For instance, with respect to large-scale LCDs, it is difficult to transmit the gate turn-on voltage (Vg1) and the gate turn-off voltage (VG2) from one end to the other end of the gate lines ($G_1$) through ($G_n$) by only one gate driver. Thus, two gate drivers may be configured such that one gate driver may connect to one end of the gate lines ($G_1$ through $G_n$), and the other gate driver may connect to the other end of the gate lines ($G_1$ through $G_n$). The gate driver 400 may be embedded within the liquid crystal panel component 300 operating as one integrated circuit having at least one TFT.

The grayscale voltage generator 800 may generate the grayscale voltage closely relative to the transmission rate of the pixels (PX). The grayscale voltage is provided to each of the pixels (PX), and the grayscale may be a positive value or a negative value in accordance with the common voltage (Vcom).

The data driver 500 connects to the data lines ($D_1$ through $D_m$) of the liquid crystal panel component 300, and applies the grayscale voltage generated by the grayscale voltage generator 800 toward the pixels (PX), which operates as the data voltage. When the grayscale voltage generator 800 only provides a reference grayscale voltage, instead of all of the grayscale voltages, the data driver 500 may divide the voltage of the reference grayscale voltage to generate a variety of grayscale voltage, and may select one of the grayscale voltage as one data voltage.

The gate driver 400 or the data driver 500 may be integrated on the liquid crystal panel component 300 together with the display signal lines, including the gate lines ($G_1$ through $G_n$) and the data lines ($D_1$ through $D_m$). Alternatively, the gate driver 400 or the data driver 500 may be installed on a flexible printed circuit film (not shown), and may be attached on the liquid crystal panel component 300 to be tape carrier package (TCP).

The signal controller 600 controls the operations of the gate driver 400 and the data driver 500.

The signal controller 600 receives the input image signals (R, G and B) and receives the output controlling signals for controlling the display of the input image signals from an external image controller (not shown), such as vertical synchronous signals (Vsync), horizontal synchronous signals (Hsync), main clock signals (MCLK), and data enable signals (DE). The signal controller 600 processes the input image signals (R, G, and B) in accordance with the input control signals to generate the image data (DAT) complying to the conditions of the liquid crystal panel component 300. Afterward, the signal controller 600 may generate the gate control signals (CONT1) and data control signals (CONT2). The gate control signals (CONT1) are transmitted to the gate driver 400, and the data control signals (CONT2) and the image data (DAT) are transmitted to the data driver 500.

The gate control signals (CONT1) may include: scanning turn-on signals (STV) for turning on the gate driver 400, i.e., the scanning operations; and at least one clock signals for controlling the output of the gate turn-on voltage (Vg1). The gate control signals (CONT1) may include output enable signals (OE) for restraining the duration of the gate turn-on voltage (Vg1). The clock signals may be selection signals (SE).

The data control signals (CONT2) may include: horizontal synchronous turn-on signals (STH) for controlling the transmission of the image data (DAT); load signals (LOAD) for applying the data voltage corresponding to the image data (DAT) toward the data lines ($D_1$ through $D_m$); and data clock signals (HCLK). The data control signals (CONT2) may include inversed signals (RVS) for inversing the polarity of the data voltage with respect to the common voltage (Vcom), which is referred to as the polarity of the data voltage hereinafter.

In response to the data control signals (CONT2), the data driver 500 receives the image data (DAT) from the signal controller 600. The grayscale voltage corresponding to the image data (DAT) is selected from a plurality of grayscale voltages provided by the grayscale voltage generator 800, and the image data is converted to the data voltage. Afterward, the data driver 500 applies the data voltage to the data lines ($D_1$ through $D_m$).

In response to the gate control signals (CONT1), the gate driver 400 apples the gate turn-on voltage (Vg1) toward the gate lines ($G_1$ through $G_n$) such that the switch components connected with the gate lines ($G_1$ through $G_n$) are turned on. Afterward, the data voltage applied to the data lines ($D_1$ through $D_m$) are transmitted to each of the pixels (PX) via the turn-on switch component.

The difference between the data voltage applied to each of the pixels (PX) and the common voltage (Vcom) may be viewed as the charging voltage of the liquid crystal capacitor of each of the pixels (PX), that is, the pixel voltage. The alignment of the liquid crystal molecules within the liquid crystal layer may be changed in accordance with the amplitude of the pixel voltage. Thus, the polarity of the light beams transmitted by the liquid crystal layer may be changed, which results in that the transmission rate of the liquid crystal layer may change.

Referring to FIG. 2, each of the pixels (PX) includes a switch component (T), a liquid crystal capacitor (Clc), and a storage capacitance (Cst). The switch component (T) is arranged at an intersection of the gate line ($GL_i$) and data line ($DL_j$), wherein $1 \leq i \leq n$. The switch component (T) may be a thin-film transistor (TFT).

The switch component (T) includes a control end connecting to the i-th gate line ($GL_i$), an input end connecting to the j-th data line ($DL_j$), and an output end connecting to the liquid crystal capacitor (Clc) and the storage capacitance (Cst).

Each of the pixels (PX) may include the pixel electrode (not shown) connecting to the output end of the switch component (T). The common electrode is provided on the down display panel facing toward the top display panel.

In one embodiment, the touch display panel may time-division scanning manner with respect to display and touch. That is, during a display phase, the common electrode provides the common voltage for corresponding pixel (PX).

During a touch phase, the common electrode may operate as one driving electrode for generating driving signals.

The liquid crystal capacitor (Clc) includes the pixel electrode connecting to the switch component (T), the common electrode, and the liquid crystals therebetween. The storage capacitance (Cst) may include the pixel electrode, the common electrode, and an insulator therebetween. The storage capacitance (Cst) keeps on charging the pixel voltage within the liquid crystal capacitor (Clc).

During the display phase, the common voltage (Vcom) is applied to the common electrode.

When the gate turn-on voltage (Vg1) is applied to the i-th gate line ($GL_i$), the control end of the switch component (T) is turned on. The data voltage is input to the pixel electrode of the pixel on the i-th row via the input end of the switch component (T). That is, the data voltage is applied to the liquid crystal capacitor (Clc) connected with the i-th gate line ($GL_i$). The data voltage charged within the liquid crystal capacitor (Clc) is called as the pixel voltage.

Afterward, when the gate turn-off voltage (VG2) is applied to the i-th gate line ($GL_i$), the control end of the switch component (T) is turned off. That is, the data voltage is applied to the pixel electrode. The pixel electrode is maintained in a floating state, that is, the level of the pixel is raised and maintained.

During the touch phase, the touch scanning signals are applied to the common electrode.

When the touch scanning voltage (TP) is applied to the common electrode, the gate turn-off voltage (VG2) applied to the i-th gate line ($GL_i$) oscillate together with the touch scanning voltage (TP) at the same amplitude. In this way, the control end of the switch component (T) is prevented from being turned on during the touch phase.

In addition, the data voltage may oscillate together with the touch scanning voltage (TP) with at the same amplitude. As such, during the touch phase, the coupling capacitance between the data line and the common electrode of the touch electrode may be reduced.

Figure 3:
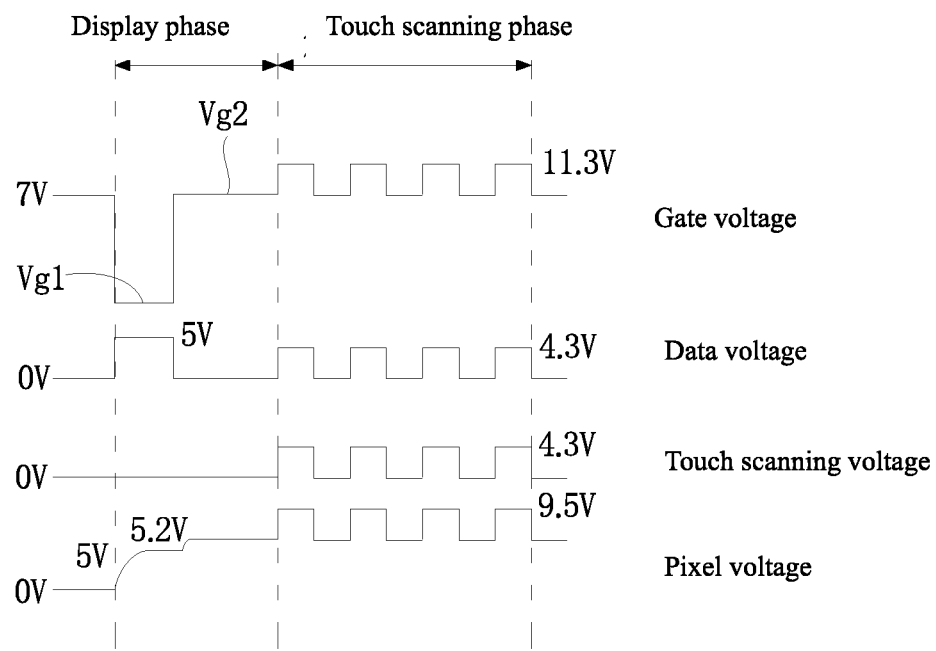
FIG. 3 is a waveform diagram of the gate voltage, the data voltage, and the touch scanning voltage in accordance with one embodiment.
Figure 4:
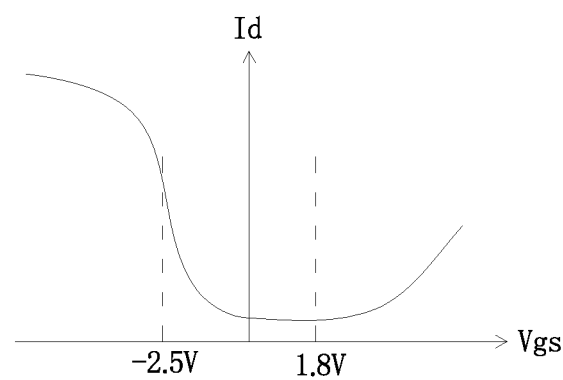
FIG. 4 is a curve diagram showing the relationship between the gate-source voltage (Vgs) and the drain current (Id) in accordance with one embodiment.
Figure 5:
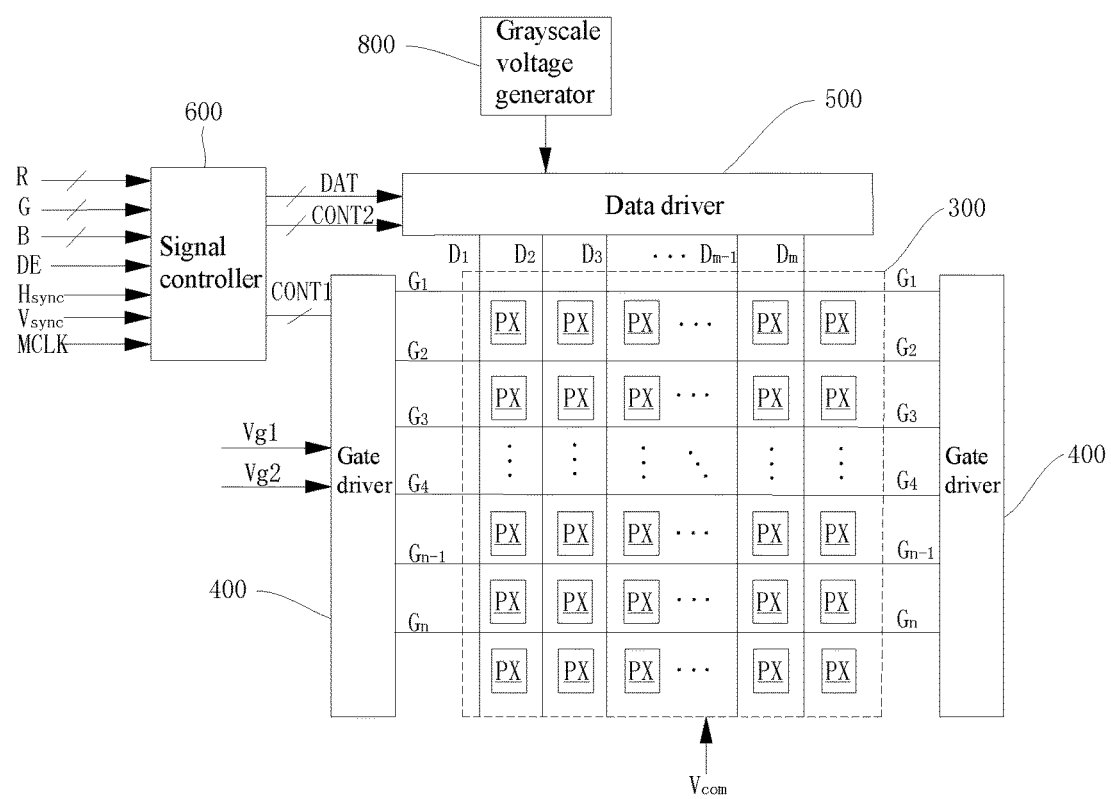
FIG. 5 is a block diagram of a touch panel made in accordance with another embodiment of the present invention.

Referring to FIGS. 3 and 4, the control end of the switch component (T) is prevented from being turned on. In an example, the PMOS-TFT is taken as one example. It can be understood that in other examples, the NMOS-TFT and CMOS-TFT, but not limited thereto, may be adopted.

FIG. 3 is a waveform diagram of the gate voltage, the data voltage, and the touch scanning voltage in accordance with one embodiment. FIG. 4 is a curve diagram showing the relationship between the gate-source voltage (Vgs) and the drain current (Id) in accordance with one embodiment.

Referring to FIG. 3, during the display phase, when the gate voltage is low, for instance, the gate turn-on voltage (Vg1) is −10V, the gate turn-on voltage (Vg1) is applied to the i-th gate line ($GL_i$). The control end of the switch component (T) is turned on. The data voltage 5V is inputted to the pixel electrode of the pixel on the i-th row via the input end of the switch component (T). That is, the data voltage 5V is charged to the liquid crystal capacitor (Clc) connected with the i-th gate line ($GL_i$).

When the gate voltage is high, that is, the gate turn-off voltage (VG2) is 7V, the gate turn-off voltage (VG2) is applied to the i-th gate line ($GL_i$), and the control end of the switch component (T) is turned off. The pixel electrode of the pixel on the i-th row is electrically disconnected.

That is, after the data voltage 5V is applied to the pixel electrode, the pixel electrode is maintained in the floating state. The pixel level (Vpixel) is raised and maintained at 5.2V. In addition, the corresponding Vgs=Vg2−Vpixel=7V−5.2V=1.8V. Referring to FIG. 4, when the Vgs equals to 1.8V, referring to the curve showing the relationship between the gate-source voltage (Vgs) and the drain current (Id), the PMOS-TFT is in a closed state.

During the touch phase, the touch scanning voltage (TP) is applied to the common electrode. When the amplitude of the touch scanning voltage (TP) is 4.3V, the pixel level (Vpixel) is raised and maintained at 9.5V. If the gate turn-off voltage (VG2) does not oscillate together with the touch scanning voltage (TP) at same amplitude, the corresponding Vgs=Vg2−Vpixel=7V−9.5V=−2.5V. Referring to the curve showing the relationship between the gate-source voltage (Vgs) and the drain current (Id), the PMOS-TFT is in an on state, which may result in pixel leakage current.

If the gate turn-off voltage (VG2) oscillates together with the touch scanning voltage (TP) at same amplitude, the gate turn-off voltage (VG2)=7V+4.3V=11.3V. The corresponding Vgs remains at 1.8V. That is, Vgs=Vg2−Vpixel=11.3V−9.5V=1.8V. Referring to FIG. 4, when the Vgs equals to 1.8V, referring to the curve showing the relationship between the gate-source voltage (Vgs) and the drain current (Id), the PMOS-TFT is in a closed state, and thus the pixel leakage current may be avoided.

In view of the above, during the touch phase, the control end of the switch component is prevented from being turned on by configuring the gate turn-off voltage to oscillate together with the touch scanning voltage at the same amplitude.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A touch panel, comprising:
   a first gate driver and a second gate driver,
   a plurality of gate lines and data lines;
   wherein the first gate driver is connected to one end of each of gate lines and the second gate driver is connected to the other end of each of the gate lines;
   wherein the gate lines and data lines are intersected with each other, and at least one switch component is arranged at the intersections of the gate lines and the data lines, and the switch component is connected to the gate line and the data line; and
   wherein during a touch scanning phase,
      when a touch scanning voltage is applied to a gate line, a gate turn-off voltage of the gate line is oscillated together with the touch scanning voltage at the same amplitude and frequency, and
   when the touch scanning voltage is applied to the data line, data voltage applied toward the data line is oscillated together with the touch scanning voltage at the same amplitude and frequency,
   during the touch scanning phase, the touch scanning voltage is applied to a common electrode,
   if the gate turn-off voltage is oscillated together with the touch scanning voltage at the same amplitude, the gate turn-off voltage is 11.3V,
   when the amplitude of the touch scanning voltage is 4.3V, a pixel level is maintained at 9.5V, and
   if the gate turn-off voltage is not oscillated together with the touch scanning voltage at the same amplitude, a gate-source voltage is 2.5V.

2. The touch panel as claimed in claim 1, wherein the switch component is a thin film transistor (TFT), a gate of the TFT connects to the gate line, a source of the TFT connects to the data line, and a drain of the TFT connects to a pixel electrode.

3. The touch panel as claimed in claim 1, wherein the switch component is a thin film transistor (TFT), a gate of the TFT connects to the gate line, a source of the TFT connects to the data line, and a drain of the TFT connects to a pixel electrode.

4. The touch panel as claimed in claim 2, wherein the TFT is a PMOS TFT, NMOS TFT, or CMOS TFT.

5. A touch display, comprising:
a touch panel comprises a first gate driver and a second gate driver,
a plurality of gate lines and data lines;
wherein the first gate driver is connected to one end of each of gate lines and the second gate driver is connected to the other end of each of the gate lines;
wherein the gate lines and data lines are intersected with each other, and at least one switch component is arranged at the intersections of the gate lines and the data lines, and the switch component is connected to the gate line and the data line; and wherein during a touch scanning phase,
when a touch scanning voltage is applied to a gate line, a gate turn-off voltage of the gate line is oscillated together with the touch scanning voltage at the same amplitude and frequency,
and
when the touch scanning voltage is applied to the data line, data voltage applied toward the data line is oscillated together with the touch scanning voltage at the same amplitude and frequency,
during the touch scanning phase, the touch scanning voltage is applied to a common electrode,
if the gate turn-off voltage is oscillated together with the touch scanning voltage at the same amplitude, the gate turn-off voltage is 11.3V,
when the amplitude of the touch scanning voltage is 4.3V, a pixel level is maintained at 9.5V, and
if the gate turn-off voltage is not oscillated together with the touch scanning voltage at the same amplitude, a gate-source voltage is 2.5V.

* * * * *